J. H. JOHNSON.
FORK SCRAPER.
APPLICATION FILED JULY 28, 1919.

1,341,750.

Patented June 1, 1920.

INVENTOR.
John H. Johnson
BY
Terry S. Webster
ATTORNEY

UNITED STATES PATENT OFFICE.

JOHN H. JOHNSON, OF LEMOORE, CALIFORNIA.

FORK-SCRAPER.

1,341,750.  Specification of Letters Patent.  Patented June 1, 1920.

Application filed July 28, 1919. Serial No. 313,738.

*To all whom it may concern:*

Be it known that I, JOHN H. JOHNSON, a citizen of the United States of America, residing at Lemoore, in the county of Kings, State of California, have invented certain new and useful Improvements in Fork-Scrapers; and I do declare the following to be a full, clear, and exact description of the same, reference being had to the accompanying drawings, and to the characters of reference marked thereon, which form a part of this application.

This invention relates to improvements in scrapers. The principal object of the invention being to provide a scraper which will be adapted for spreading and cleaning up manure, hay and the like, and is therefore especially useful on farms and around dairy yards, etc.

The materials mentioned are almost impossible to scrape with a solid faced scraper, as they tend to merely bank up in front of the same instead of riding thereon, as is well known by anyone who has tried to gather up manure, etc., with an ordinary hand shovel or spade.

I have therefore provided my scraper with strong teeth so that they will easily penetrate the materials to be gathered up. This scraper is also adapted for orchard work, to clean off the weeds, for uprooting sod, cleaning the bottoms of ditches of their weeds and debris, and, in fact, for any work where the nature of the materials to be scraped render the use of the ordinary scraper impractical, and a penetrating rather than a cutting action desired.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1 is a perspective elevation of my improved scraper.

Fig. 2 is a side elevation of the same in dumping position.

Fig. 3 is a perspective view of one of the scraper prongs detached.

Referring now more particularly to the characters of reference on the drawings, the numeral 1 denotes the main beam or frame of the scraper of substantial construction.

Secured to this beam are a plurality of sharp pointed prongs 2 adapted to normally rest on the ground ahead of the beam and which have an upstanding portion $2^a$ projecting vertically through the beam 1, being fastened therein by means of nuts 3 above and below the beam 1.

In order to hold the lower portion of the prongs in parallel alinement and to prevent them from turning in the beam, I provide a strap or bar 4 adapted to lay on the prongs and be secured thereto by means of bolts 5, passing through bosses $2^b$ provided on the prongs 2. If preferred, U-bolts may be used to hold the prongs to the strap 4.

Straps 6 extend forward from the beam 1, the strap 4 being bent upward at its ends and secured to the straps 6.

A clevis 7 is connected with each strap 6 at its forward end. The clevises in turn are connected to drawbars 8, which are held in substantially rigid and parallel relation by means of a cross bar 9 at the forward end of the drawbars and by diagonal braces 10.

The drawbars are provided with a common form of swingletree hooks $8^a$ in order that a draft animal may be attached thereto to draw the scraper.

The positioning of the straps 6 relative to the ground and the connection thereof with the clevises relative to the beam 1 is preferably such that a pulling movement on the scraper tends to retain the prongs 2 level with the ground instead of their having a tendency to dig into the same, thus allowing the scraper to take a load from the surface only.

A suitable guide and tipping handle or lever 11 is provided behind the beam 1 and secured thereto, being further held by means of braces 12.

The rear end of the handle has an eye $11^a$ therein through which the end of a rope 13 may be passed in order to pull the scraper back to its normal level after dumping.

Positioned centrally of the beam 1 and above the same is a curved runner 14 suitably braced to the handle 11 by means of a bar 15. This runner is of sufficient strength and width of face to easily take the weight of the scraper thereon and travel along and rest on the ground when the scraper is dumped.

The braced drawbars 8 insure of an equal pull on both sides of the scraper, irrespective of the pull of the team drawing the scraper.

All the prongs are of course of the same dimensions, so as to be easily interchanged or replaced.

The straps 6 and the correct positioning thereof, which with the clevises form a pivotal point or hinge for the tilting of the scraper, are a very important feature of my device.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A scraper comprising a frame, such frame having a relatively high main transverse beam and a bar positioned forward of and below the same, a plurality of round prongs mounted at right angles to the bar and passing thereunder and being each removably secured thereto, right angled extensions formed with the prongs and extending upward through the beam, the upper ends of such extension being threaded, and nuts on the same impinging against the upper and lower faces of the beam.

2. A scraper comprising a relatively high main beam, prongs removably secured to the beam and extending forward of and below the same, a curved runner secured to the beam centrally thereof and above the same, straps extending forward of the beam from the ends thereof, and drawbars swivelly connected to the straps, the drawbars being rigidly braced together to insure equality of pull on the side straps.

In testimony whereof I affix my signature in presence of two witnesses.

JOHN H. JOHNSON.

Witnesses:
  E. WANGER,
  M. G. SHERWOOD.